(12) United States Patent
Kawano et al.

(10) Patent No.: US 8,461,243 B2
(45) Date of Patent: Jun. 11, 2013

(54) OPTICAL RESIN COMPOSITION AND METHOD FOR PRODUCING THE SAME

(75) Inventors: Tetsuo Kawano, Minami-Ashigara (JP); Tatsuya Ishizaka, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 13/204,054

(22) Filed: Aug. 5, 2011

(65) Prior Publication Data

US 2011/0288222 A1 Nov. 24, 2011

Related U.S. Application Data

(62) Division of application No. 11/993,870, filed as application No. PCT/JP2006/312141 on Jun. 16, 2006, now abandoned.

(30) Foreign Application Priority Data

Jun. 24, 2005 (JP) .................................. 2005-185822
Mar. 9, 2006 (JP) .................................. 2006-064653

(51) Int. Cl.
*C08K 3/00* (2006.01)

(52) U.S. Cl.
USPC ......... 524/424; 264/1.1; 423/419.1; 423/430; 423/433

(58) Field of Classification Search
USPC ....................................................... 524/424
See application file for complete search history.

(56) References Cited

U.S. PATENT DOCUMENTS

| 5,164,172 | A | * | 11/1992 | Katayama et al. | ............ 423/432 |
| 6,479,029 | B1 | | 11/2002 | Mingels et al. | |
| 6,586,515 | B1 | | 7/2003 | Koike | |
| 2004/0212112 | A1 | | 10/2004 | Tsujimoto | |
| 2005/0119389 | A1 | * | 6/2005 | Koike | ............ 524/425 |
| 2005/0207016 | A1 | | 9/2005 | Ando | |
| 2009/0124744 | A1 | | 5/2009 | Ishizaka et al. | |

FOREIGN PATENT DOCUMENTS

| EP | 0 328 712 A1 | 8/1989 |
| JP | 59-203728 A | 11/1984 |
| JP | 2004-35347 A | 2/2004 |
| JP | 2004-109355 A | 4/2004 |
| JP | 2006-193406 A | 7/2006 |
| WO | WO 01/25364 A1 | 4/2001 |
| WO | WO 2006/064931 * | 7/2006 |

OTHER PUBLICATIONS

PCT/ISA/210 and PCT/ISA/234 for PCT/JP2006/312141 dated Sep. 5, 2006.

(Continued)

*Primary Examiner* — Doris Lee
(74) *Attorney, Agent, or Firm* — Buchanan Ingersoll & Rooney PC (57) ABSTRACT

To provide an optical resin composition containing carbonate crystals, which have oriented birefringence, have a needle- or rod-like shape, and are able to negate the birefringence without sacrificing the light transmittance of a transparent polymeric resin where the carbonate crystal exists, and a method for producing the resin composition. To achieve this provided are an optical resin composition containing a resin and carbonate crystals, wherein the carbonate crystals have a specific surface area of 4 $m^2/g$ or more, and the carbonate crystals dispersed into the resin have an average dispersion diameter of 500 nm at a maximum, and a method for producing the optical resin composition.

8 Claims, 2 Drawing Sheets

OTHER PUBLICATIONS

Tagaya, Akihiri et al., "Compensation of the Birefringence of a Polymer by a Birefringent Crystal," Science, vol. 301, pp. 812-814, 2003.
Koike, Yasuhiro, et al., "Zero-Birefringence Optical Polymer by Birefringent Crystal and Analysis of the Compensation Mechanism," Macromol. Symp., vol. 235, pp. 64-70, 2006.
The Merck Index, Fourteenth Edition, 2006, p. 8850, Strontium Carbonate.
Office Action (Notice of Grounds) issued in corresponding Korean Patent Application No. 2008-7001738, dated Jan. 23, 2013, w/English Translation (13 pgs).

* cited by examiner

OPTICAL RESIN COMPOSITION AND METHOD FOR PRODUCING THE SAME

CROSS-REFERENCE TO RELATED APPLICATIONS

This application is a divisional of application Ser. No. 11/993,870, filed Dec. 24, 2007, the contents of which are incorporated herein by reference, which was the National Stage filing under §371 of PCT/JP2006/0312141, filed Jun. 16, 2006, which in turn claims priority to Japanese Application Nos. 2005-185822 and 2006-064653, filed Jun. 24, 2005 and Mar. 9, 2006, respectively.

TECHNICAL FIELD

The present invention relates to an optical resin composition containing carbonate crystals which have oriented birefringence, have a needle- or rod-like shape and are able to negate the birefringence without sacrificing the light transmittance of a transparent resin where the carbonate crystal exists, and a method for producing the optical resin composition.

BACKGROUND ART

Carbonates such as calcium carbonate have long been widely used in areas such as rubber, plastics and papermaking. Recently, many types of carbonates with high functionality have been developed and put into practical use for a variety of applications and purposes according to particle shapes and diameters.

Examples of crystal forms of the carbonates include calcite, aragonite and vaterite. Of these, the aragonite is needle-like and has superior hardness and coefficient of elasticity, and it may be used for versatile applications.

Commonly known methods for producing the carbonates are, for example: (1) a reaction of a solution containing carbonate ions with a chloride solution, and (2) a reaction of chloride with carbon dioxide. Also, Patent Literature 1 proposes a method regarding the method (1) to produce a needle-like carbonate having aragonite structure, wherein a reaction of a solution containing carbonate ions with a chloride solution takes place under ultrasonic irradiation. However, the carbonate obtained by the production method described in Patent Literature 1 is not only oversized of 30 μm to 60 μm in length but also has a wide distribution in the particle size; a carbonate controlled for a desired particle size may not be obtained.

In addition, regarding a method of introducing carbon dioxide into water slurry of $Ca(OH)_2$, Patent Literature 2 proposes a method to place a seed crystal of needle-like aragonite in $Ca(OH)_2$ water slurry and grow the seed crystal only in a certain direction. Furthermore, there is a problem that only a large particle of 20 μm to 30 μm in length may be obtained even with the method for producing a carbonate described in Patent Literature 2.

On the other hand, in recent years, the majority of optical-glass products such as glass lens and camera lens have been replaced by polymeric optical materials in view of their lightness, easy processing, superior mass productivity, and simplicity in application of molding technologies such as injection molding and extrusion molding. For materials of optical components for opto-electronics, especially for optical components used for laser-related devices such as optical disc devices for recording sounds, images, literal information and the like, there is a strong tendency to use polymeric materials.

A polymeric material having birefringence does not cause a problem when it is applied to optical components which do not require relatively high precision. However, optical components requiring higher precision have been demanded recently, and birefringence is a big issue in case of, for example, a writable/erasable magneto-optical disc. Birefringence is a property that a light beam passing through a certain substance is separated into two light beams depending on the conditions of polarized light beams. Birefringence index is given as the difference in refractive index between the directions of the polarized lights in the substance.

However, there is a problem that an optical component obtained by molding the common polymeric materials exhibits birefringence. A semiconductor laser beam is used for reading and writing this kind of magneto-optical disc; the existence of an optical component with birefringence in the disc itself or in the lens, for example, on the light path may adversely affect the precision in reading or writing.

Given this factor, Patent Literature 3 proposes a non-birefringent optical resin material containing a polymeric resin and an inorganic fine particle having different signs of birefringence for the purpose of reducing the birefringence. The non-birefringent optical resin material of this proposal is obtained by a method called crystal doping, wherein, for example, a number of inorganic fine particles are dispersed in a polymeric resin, and the bonding chains in the polymeric resin and the inorganic fine particles are oriented in an approximately parallel direction by externally applying a molding force such as drawing so as to diminish the birefringence caused by the orientation of the bonding chain in the polymeric resin with the birefringence of the inorganic fine particles having an opposite sign.

As stated above, inorganic fine particles that may be used for a crystal doping is essential in order to obtain a non-birefringent optical resin material through the crystal doping. The inorganic fine particles are required to have a shape with a high aspect ratio such as a needle- or rod-like shape to align the carbonate particles along the orientation of the bonding chain in the polymeric resin. Carbonate particles which do not influence a light transmittance, which is an important function as an optical material, is demanded. In addition, the average particle size of carbonate crystals need to be sufficiently small compared to the wavelength of a light source to reduce the effect of light scattering by particles as much as possible so that it does not affect the light transmittance.

However, it is difficult to disperse carbonate crystals in a resin without causing flocculation, and merely designing individual carbonate crystal particles to have a desired form or size is not necessarily satisfactory. Therefore, development of a technology for preventing decrease in transmittance of the optical resin material caused by the flocculation of carbonate crystal particles is highly demanded.

Patent Literature 1 Japanese Patent Application Laid-Open (JP-A) No. 59-203728
Patent Literature 2 U.S. Pat. No. 5,164,172
Patent Literature 3 International Publication WO No. 01/25364

DISCLOSURE OF INVENTION

An object of the present invention aims to solve the conventional problems and achieve the following objects. Specifically, the object of the present invention is to provide an optical resin composition containing a carbonate crystal (hereinafter may be referred to as "carbonate particle" or "carbonate crystal particle"), which has oriented birefringence, is needle- or rod-like, and is able to negate the birefringence without sacrificing the light transmittance of a transparent polymeric resin where the carbonate crystal exists, and a method for producing the optical resin composition.

In view of the above-mentioned shortcomings, the inventors of the present invention have conducted extensive studies and established that in order for resin to keep high transparency, it is critical that carbonate crystal fine particles having a specific surface area of 4 m²/g or more be taken out beforehand as a dry powder with no flocculated particles by removing adsorbates from the particle surfaces prior to addition into resin, and then the carbonate crystal fine particles are dispersed into the resin, whereby an optical resin composition can be obtained that negates birefringence without sacrificing light transmittance.

The present invention is based on the findings of the inventors, and the means for solving the problem is as follows:

<1> An optical resin composition containing a resin and carbonate crystals having a specific surface area of 4 m²/g or more, wherein the carbonate crystals dispersed into the resin have an average dispersion diameter of 500 nm at a maximum.

<2> The optical resin composition according to <1>, wherein the optical resin composition has a light transmittance of 86% or greater at a wavelength of 450 nm.

<3> The optical resin composition according to any one of <1> and <2>, wherein the content of the carbonate crystals relative to the resin is 0.01% by mass to 15.00% by mass.

<4> The optical resin composition according to any one of <1> to <3>, wherein the resin is any one selected from a cellulose acylate resin, a polyethylene terephthalate resin, a polyethylene naphthalate resin and a polycarbonate resin.

<5> The optical resin composition according to any one of <1> to <4>, wherein the optical resin composition is used in a drawn film.

<6> The optical resin composition according to any one of <1> to <5>, wherein the carbonate crystals have an aspect ratio of 2 or greater, an average major axis length of 400 nm or shorter, and a variation coefficient of the major axis expressed by Formula (1) of 0.40 or less:

$$\frac{1}{r} \times \left\{ \frac{1}{n-1} \sum_{i=1}^{n} (r_i - r)^2 \right\}^{\frac{1}{2}} \quad \text{Formula (1)}$$

wherein r denotes an average major axis length, n denotes the number of particles whose major axis length is measured, and $r_i$ denotes the major axis length of the $i^{th}$ particle measured.

<7> The optical resin composition according to any one of <1> to <6>, wherein the carbonate crystals are produced by reacting a metal ion source containing at least one metal ion selected from $Sr^{2+}$, $Ca^{2+}$, $Ba^{2+}$, $Zn^{2+}$ and $Pb^{2+}$ with a carbonate source in liquid.

<8> The optical resin composition according to <7>, wherein the carbonate crystals are produced by the method including increasing, at least once, the number of the carbonate crystals in liquid, and increasing, at least once, only the volume of the carbonate crystals in liquid.

<9> The optical resin composition according to any one of <7> to <8>, wherein the optical resin composition is formed by reacting the metal ion source with the carbonate source in liquid by a single-jet method.

<10> The optical resin composition according to any one of <1> to <9>, wherein the optical resin composition is used in an optical element.

<11> The optical resin composition according to <10>, wherein the optical element is a magneto-optical disc.

<12> A method for producing an optical resin composition including:
producing carbonate crystals, and dispersing the produced carbonate crystals into a resin, wherein the step of producing carbonate crystals includes reacting a metal ion source containing at least one metal ion selected from $Sr^{2+}$, $Ca^{2+}$, $Ba^{2+}$, $Zn^{2+}$ and $Pb^{2+}$ with a carbonate source in liquid.

<13> The method for producing an optical resin composition according to <12>, wherein the carbonate crystals have a specific surface area of 4 m²/g or more, and the carbonate crystals dispersed into the resin have an average dispersion diameter of 500 nm at a maximum.

<14> The method for producing an optical resin composition according to any one of <11> to <13>, wherein the step of producing carbonate crystals includes removing an adsorbate from surfaces of the carbonate crystals.

<15> The method for producing an optical resin composition according to <14>, wherein the step of removing an adsorbate includes any one of a method for washing the carbonate crystal at least once by decantation and a method for subjecting the carbonate crystal to ultrafiltration at least once.

<16> The method for producing an optical resin composition according to <15>, wherein a supernatant obtained by decantation or a filtrate obtained by the ultrafiltration has a conductivity of 100 µS/cm or less.

<17> The method for producing an optical resin composition according to any one of <12> to <16>, wherein the step of producing carbonate crystals includes increasing, at least once, the number of the carbonate crystal in liquid, and increasing, at least once, only the volume of the carbonate crystals in liquid.

<18> The method for producing an optical resin composition according to any one of <12> to <17>, wherein the step of producing carbonate crystals includes reacting the metal ion source with the carbonate source in liquid by a single-jet method.

<19> The method for producing an optical resin composition according to any one of <12> to <18>, wherein the temperature of the step of increasing the number of the carbonate crystals is −10° C. to 40° C., and a temperature of the step of increasing the volume of the carbonate crystal is 1° C. to 60° C. and not less than the temperature of the step increasing the number of the carbonate particles.

<20> The method for producing an optical resin composition according to <12>, wherein the step of dispersing the carbonate crystals into the resin includes dispersing the carbonate crystal into the resin by kneading.

<21> The method for producing an optical resin composition according to <12>, wherein in the step of dispersing the carbonate crystal into the resin the carbonate crystals are added into the resin at least before completion of the polymerization reaction for the preparation of the resin.

<22> The method for producing an optical resin composition according to any one of <20> and <21>, wherein a method for molding the optical resin composition in which the carbonate crystal is dispersed is any one of an injection molding, press molding and extrusion molding.

<23> The method for producing an optical resin composition according to <22>, wherein the optical resin composition obtained by the injection molding, press molding and extrusion molding is drawn so as to form a film.

The present invention can solve the conventional problems and provide an optical resin composition containing a carbonate crystal which has oriented birefringence, is needle- or rod-like and is able to negate the birefringence without sacrificing light transmittance of a transparent polymeric resin where the carbonate crystal exists, and a method for producing the optical resin composition.

BEST MODE FOR CARRYING OUT THE INVENTION (Optical Resin Composition)

An optical resin composition of the present invention contains a carbonate crystal in the invention dispersed into a resin, and optionally other components.

—Carbonate Crystal—

The carbonate crystals can be obtained by reacting a metal ion source with a carbonate source in liquid, and their specific surface area, aspect ratio, average major axis length and variations in the major axis fall within respective predetermined ranges. The carbonate crystal is added to resin for use and has a relative value for light transmittance at a wavelength of 450 nm of not less than a predetermined value.

—Metal Ion—

The metal ion source is not particularly limited and may be suitably selected in accordance with the intended use as long as it contains a metal ion. Examples of the metal ion sources include $Sr^{2+}$ ion, $Ca^{2+}$ ion, $Ba^{2+}$ ion, $Zn^{2+}$ ion and $Pb^{2+}$ ion. Of these, $Sr^{2+}$ ion, $Ca^{2+}$ ion, and $Ba^{2+}$ ion, each of which is an alkali earth metal ion, are particularly preferable from the perspective of reactivity. A metal ion source capable of reacting with a carbonate source and forming a carbonate having any one of crystal forms of calcite, aragonite, vaterite, and amorphous is preferable, and a metal source capable of forming a carbonate having an aragonite crystal structure is particularly preferable.

The aragonite crystal structure is represented by $CO_3^{2-}$ unit, a plurality of the $CO_3^{2-}$ unit are formed in a laminate structure to form a carbonate crystal having a needle-like shape or a rod-like shape. Thus, anisotropy arises in the crystal structure, the refractive index varies depending on the axial direction of the crystal, and the crystal results in a biaxial and negative optical crystal. Table 1 shows respective refractive indexes of crystals in each of crystal axial directions of carbonates of which the metal ion is $Ca^{2+}$, $Sr^{2+}$, $Ba^{2+}$, or $Pb^{2+}$ in carbonate particles. For the reason, the carbonate is drawn in arbitrarily determined one direction by a drawing process, which will be described below, and crystal molecules are arrayed in a state where the major axis direction of the particles corresponds to the drawing direction. Thus, the orientation birefringence of the resin can be controlled by mixing the resin to a resin having a positively orientated birefringence.

TABLE 1

|  | α | β | γ | δ | specific gravity |
|---|---|---|---|---|---|
| $CaCO_3$ | 1.530 | 1.681 | 1.685 | 0.155 | 2.94 |
| $SrCO_3$ | 1.520 | 1.667 | 1.669 | 0.149 | 3.75 |
| $BaCO_3$ | 1.529 | 1.676 | 1.677 | 0.148 | 4.29 |
| $PbCO_3$ | 1.804 | 2.076 | 2.078 | 0.274 | 6.55 |

The metal ion source is not particularly limited and may be suitably selected in accordance with the intended use as long as it contains $Sr^{2+}$ ion, $Ca^{2+}$ ion, $Ba^{2+}$ ion, $Zn^{2+}$ ion, and $Pb^{2+}$ ion and examples thereof include at least one of nitrate salts, chlorides, and hydroxides selected from Sr, Ca, Ba, Zn, and Pb. Of these, hydroxides and chlorides are particularly preferable from the perspective of reactivity.

Preferably, the metal ion source contains at least any one of $NO_3^-$, $Cl^-$, and $OH^-$. Specifically, examples of the metal ion sources include $Sr(NO_3)_2$, $Ca(NO_3)_2$, $Ba(NO_3)_2$, $Zn(NO_3)_2$, $Pb(NO_3)_2$, $SrCl_2$, $CaCl_2$, $BaCl_2$, $ZnCl_2$, $PbCl_2$, $Sr(OH)_2$, $Ca(OH)_2$, $Ba(OH)_2$, $Zn(OH)_2$, $Pb(OH)_2$, and hydrates thereof.

—Carbonate Source—

The carbonate source is not particularly limited and may be suitably selected in accordance with the intended use as long as it generates $CO_3^{2-}$ ion. Examples thereof include sodium carbonate [$Na_2CO_3$], sodium hydrogen carbonate [$NaHCO_3$], carbon dioxide gas and urea [$(NH_2)_2CO$]. Of these, sodium carbonate, ammonium carbonate, and carbon dioxide gas are particularly preferable from the perspective of reactivity.

—Specific Surface Area, Aspect Ratio, Average Major Axis Length and Variation in Major Axis—

It is required that the specific surface area of the carbonate crystal particles or surface treated carbonate crystal particles, as measured prior to addition to resin, be 4 $m^2/g$ or more, more preferably 6 $m^2/g$ or more, and particularly preferably 8 $m^2/g$ or more. When the specific area is less than 4 $m^2/g$, it is often the case that the crystal carbonate particles have already flocculated at the time of producing the crystal carbonate, and even when the crystal carbonate is added to and dispersed into the resin, the flocculated crystal carbonate is further flocculated to cause a greater size of aggregate, resulting in significant decrease in light transmittance.

The specific surface area of the crystal carbonate can be measured using a commercially available nitrogen-adsorption apparatus. For example, the specific surface area can be measured using an automatic specific surface area/micropore distribution analyzer (BELSORP-mini, manufactured by BEL JAPAN Inc.).

The aspect ratio of the carbonate particle is required to be 2 or more, preferably 3 to 20, and particularly preferably 3 to 8.

When the aspect ratio is less than two, the shape of the carbonate crystal is closer to a granulated shape or a spherical shape, the occurrence of the particle orientation along the molecular orientation of the transparent resin becomes less probable, or it does not occur at all. Consequently, the present invention becomes ineffective. When the aspect ratio of the carbonate particle is more than 20, the carbonate particles are destructed in the course of producing the optical resin composition, and resultingly, the major axis direction of the carbonate particle may not be aligned in one direction, although the present invention relates to a technique of compensating orientation birefringence associated with molecular orientation by making the orientation of molecules develop in accordance with the molecular orientation of the transparent resin.

The average of the major axis length which is the maximum length of a needle- or rod-like shaped carbonate crystal along its long axis direction is preferably shorter than the wavelength of visible light (approximately 400 nm to 780 nm) in order to suppress the decrease in transmittance of the transparent optical resin as much as possible. Therefore, the average major axis length of the carbonate crystal should be 400 nm or shorter. It is preferably 300 nm or shorter, and more preferably 200 nm or shorter. The effect of Mie scattering by particles increases when the average major axis length is longer than 400 nm. This accelerates the decrease in the light transmittance, and the material loses its value as a transparent optical material.

Regarding the variation in the major axis, the variation coefficient of the major axis should be 0.40 or less in order to reduce the content of the particles that cause transmittance reduction by light scattering and thereby to achieve a practically low light-scattering status. The variation coefficient of a major axis is expressed as a ratio of the standard deviation of the major axis to the average major axis length, and it may be obtained from Formula (1):

$$\frac{1}{r} \times \left\{ \frac{1}{n-1} \sum_{i=1}^{n} (r_i - r)^2 \right\}^{\frac{1}{2}} \quad \text{Formula (1)}$$

where r denotes the average major axis length, n the number of particles used for measurement of the major axis length, and $r_i$ the major axis length of the $i^{th}$ particle measured.

The value of n is preferably large. Although it is set at 100 or greater, the value of n is more preferably 200 or greater. The particle distribution may not be accurately represented with the value of n less than 100. When the variation coefficient is expressed in percentage, the value obtained from Formula (1) is multiplied by 100. For example, the variation coefficient of 0.40 or less may be expressed as the variation coefficient of 40% or less.

The variation coefficient of the major axis is preferably small. More specifically, it is preferably 0.30 or less, and more preferably 0.20 or less. The variation coefficient of the major axis of greater than 0.40 increases the proportion of particles having a major axis of longer than the average major axis length, and the light transmittance in the resin may be decreased.

The each method of measuring the major axis length, aspect ratio, variation coefficient and the like of the carbonate crystal is not particularly limited and may be suitably selected in accordance with the intended use. For example, adequately dispersed carbonate particles are observed through the use of a transmission electron microscope (TEM); the shot image of particles is scanned and stored as an image file; the image file information is opened with Mac-View Ver. 3, a particle size distribution analysis software manufactured by Mountech Co., Ltd., and each of the particles is measured; and finally the results are calculated.

—Dispersion Diameter and Dispersion Content—

A dispersion diameter means the average of maximum long axis lengths of individual dispersed particles, and also encompasses the dispersion diameters of primary particles, secondary particles, lattice-shaped particles, chain-linked particles, and amorphous cubic particles. When an average dispersion diameter is defined as an average size of the carbonate crystal particles actually residing in the resin after the carbonate crystal particles are mixed with the resin by kneading or the like, the average dispersion diameter of the carbonate crystal particles dispersed into the resin is preferably 500 nm at a maximum, more preferably 450 nm or less, and particularly preferably 400 nm or less. When the average dispersion diameter is greater than 500 nm, the transparency of the resin containing the carbonate crystals may be significantly decreased. The average dispersion diameter of the carbonate crystals can be determined by observing the carbonate crystals residing in the resin using a scanning electron microscope (SEM); the shot image of the particles is scanned and stored as an image file; the image file information is opened with Mac-View Ver. 3, a particle size distribution analysis software manufactured by Mountech Co., Ltd., and the maximum major axis length of each particle is measured; and finally the results are averaged.

The content of the carbonate crystal relative to the resin is preferably 0.01% by mass to 15.00% by mass, more preferably 0.05% by mass to 3.00% by mass, and particularly preferably 0.10% by mass to 2.00% by mass. When the content of the carbonate crystal is less than 0.01% by mass, an effect of controlling birefringence by adding the particles may not be exerted. When the content of the carbonate crystal is more than 15.00% by mass, the optical resin composition has an effect of controlling birefringence, but may not keep necessary transparency.

—Resin—

The resin is not particularly limited and may be suitably selected in accordance with the intended use as long as it is generally used in optical components, and has a certain degree of transparency. Examples of the resins include polyolefins such as polyethylene and polypropylene; aromatic vinyl polymers such as polystyrene; a poly(meth)acrylic esters such as polymethylmethacrylate; polyphenylene oxide, polycarbonate, polyvinyl chloride, polyethylene terephthalate, polyethylene naphthalate, cyclohexyl methacrylate, cellulose acylate, alicyclic polyolefin (for example, a cyclic olefin ring-opening polymer or copolymer such as norbornene polyolefin); and a copolymer of alicyclic(meth) acrylate such as isobornyl methacrylate and (meth)acrylphenylene ether. Of these, the polyethylene terephthalate, the polyethylene naphthalate, the cellulose acylate and the polycarbonate as a resin having preferable optical and physical properties, and the polycarbonate is most preferable since it sufficiently develops an advantageous effect of the present invention even with an incident light in an oblique direction.

—Light Transmittance at Wavelength of 450 nm—

The light transmittance at a wavelength of 450 nm is preferably 86% or more in the optical resin composition in which the carbonate crystal is added to the resin, more preferably 86.5% or more, and particularly preferably 87% or more. When the light transmittance is less than 86%, the transparency of the resin is lowered and then the optical information may be decreased.

When the film thickness of the resin is set at 100 μm, the light transmittance at a wavelength of 450 nm in the resin before the carbonate crystal being added thereto is taken as x %, and the light transmittance at a wavelength of 450 nm in the resin after the carbonate crystal being added thereto is taken as y %, the value y/x is preferably 0.98 or more, particularly preferably 0.99 or more, and 1 is the most preferable. When the value y/x is less than 0.98, the transparency of the resin to which the carbonate crystal is added may be impaired.

—Application—

The characteristic birefringence values of resins containing birefringence have been documented, for example, by Fumio Ide on page 29 of "Contemporary transparent resins— the world of high-performance optical material for challenging IT—" (Kogyo Chosakai Publishing, Inc.; first edition), and are listed in Table 2. Table 2 indicates that the most of the resins contain positive birefringence. Also, when strontium carbonate particles with a shape having a high aspect ratio such as a needle- or rod-like shape are employed as the carbonate and added for example to polycarbonate used as the optical polymer followed by drawing of the polycarbonate, the carbonate particles align along the orientation of the polymer molecules For example, Yasuhiro Koike and Tagaya Akihiro "Polymer and Advanced Materials One Point 1 Photonics Polymer" (KYORITSU SHUPPAN Co., Ltd.; first edition) discloses that selection of inorganic crystals having a high aspect ratio and birefringence whose sign is opposite to the sign of the birefringence of the polymer in the aligned state leads to cancellation of birefringence. Thus, it is made possible not only to exactly cancel birefringence, but also to make the relative birefringence negative. Therefore, the carbonate crystals may be suitably employed for optical components, and more preferably resins make up optical elements in which the birefringent properties is important and high precision is required.

TABLE 2

| Polymer | Birefringence |
| --- | --- |
| Polystyrene | −0.10 |
| Polyphenylene ether | 0.21 |
| Polycarbonate | 0.106 |
| Polyvinyl chloride | 0.027 |
| Polymethylmethacrylate | −0.0043 |
| Polyethylene terephthalate | 0.105 |
| Polyethylene | 0.044 |

(Method for Producing Optical Resin Composition)

The method for producing the optical resin composition includes a process of producing a carbonate crystal, and a process of dispersing the produced carbonate crystal into a resin, and further includes other processes in accordance with the necessity.

—Process of Producing Carbonate Crystal—

A process of producing a carbonate crystal includes a treatment of reacting the metal ion source with the carbonate source in liquid so as to obtain a carbonate crystal, and a treatment of removing an adsorbate from a carbonate crystal surface (hereinafter may be simply referred to as an adsorbate removal treatment), and further includes other treatments in accordance with the necessity. In the treatment of reacting the metal ion source with the carbonate source in liquid so as to obtain carbonate crystals, a treatment of increasing the number of carbonate particles and a treatment of increasing only the volume of carbonate particles (hereinafter may be simply referred to as volume increasing treatment) may be separately performed.

—Reaction Method—

The method of reacting the metal ion source with the carbonate source in liquid is not particularly limited and may be suitably selected in accordance with the intended use, for example, a method in which the metal ion source and the carbonate source are added in liquid at the same time to react them, from the perspective of reactivity. Examples of the methods include a double-jet method and a single-jet method. To obtain a carbonate crystal in the invention, both methods can be used, however, when a metal hydroxide is used as the metal ion source, the single-jet method is preferably used. Further, specifically, when a solvent used in the reaction contains water, the concentration of a metal hydroxide is increased because of the metal hydroxide having a low solubility to water. Thus, all the metal hydroxide is not dissolved in water and forms suspension. Then, the suspension is left at rest, the undissolved metal hydroxide is settled out. In most cases, a raw material tank used for the double-jet method or single-jet method is not equipped with a stirring equipment, and therefore, it is unfavorable that a suspension is poured into the raw material tank. It is most preferable that the metal hydroxide suspension is previously put in a reaction vessel equipped with stirring blades, and the carbonate source is preferably added in the suspension using a nozzle. Thus, the single-jet method is preferably used.

—Double Jet Method—

Figure 1:
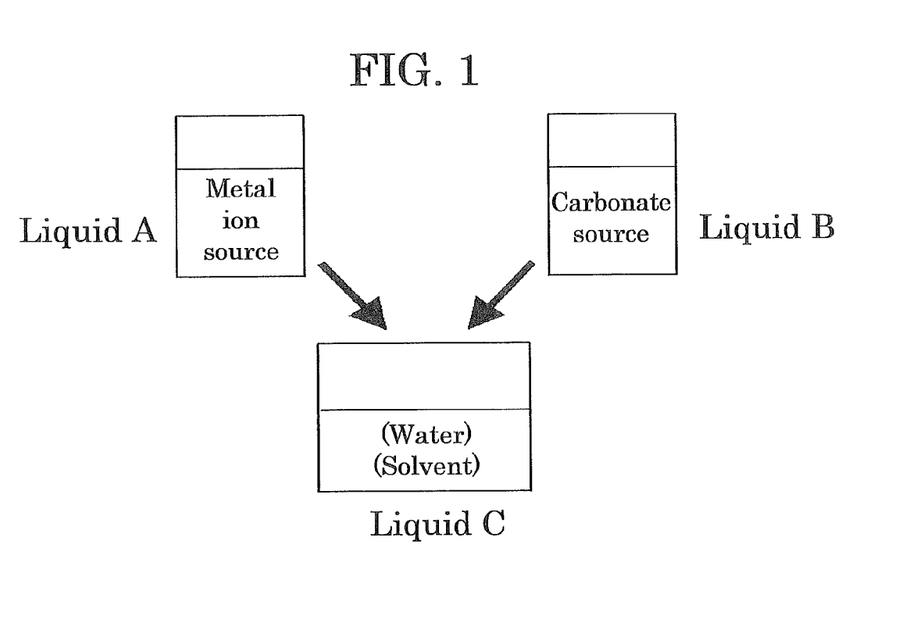
FIG. 1 is a process drawing illustrating an example of process of producing carbonate crystals by means of a double jet method in the method for producing an optical resin composition of the present invention.

In the double-jet method, the metal ion source and the carbonate source are respectively added on surfaces of individual reaction liquids or in individual liquids by spraying to react them. For example, as shown in FIG. 1, a liquid containing the metal ion source (Liquid A) and a liquid containing the carbonate source (Liquid B) are sprayed in Liquid C at the same time to react the metal ion source and the carbonate source in Liquid C.

The addition rate of the metal ion source and the carbonate source by the double-jet method is not particularly limited and may be suitably adjusted in accordance with the intended use. Further, it is preferable to determine the molar addition rate such that the final product can take the stoichiometric mixture ratio. In the present invention, an equimolar addition rate is most preferable. When the treatment of increasing the number of the carbonate particle and the treatment of increasing the volume of the carbonate particle are separately performed in the course of forming the final product, the addition rate and the reaction temperature used in each treatment are sometimes varied.

The double-jet method can be carried out using, for example, a double-jet reactive crystallization apparatus disclosed in Japanese Patent Application Laid-Open (JP-A) No. 05-107668. The apparatus includes a reaction vessel, stirring blades equipped in the reaction vessel and near the stirring blades provided with two or more nozzles for supplying raw material solutions. The metal ion source (Liquid A) supplied from a nozzle and the carbonate source (Liquid B) supplied from another nozzle are mixed in an uniform state at a high speed by the stirring blades, and it is possible to uniformly mix and react the both liquids in Liquid C in a moment of time.

The stirring rate in the double-jet method is preferably 500 rpm to 1,500 rpm from the perspective of uniformizing concentration distributions of the reaction system, which continuously vary.

—Single-Jet Method—

In the single-jet method, any one of the metal ion source and the carbonate source is added on the liquid surface of the other source or in the other source liquid by spraying to react them.

Figure 2:
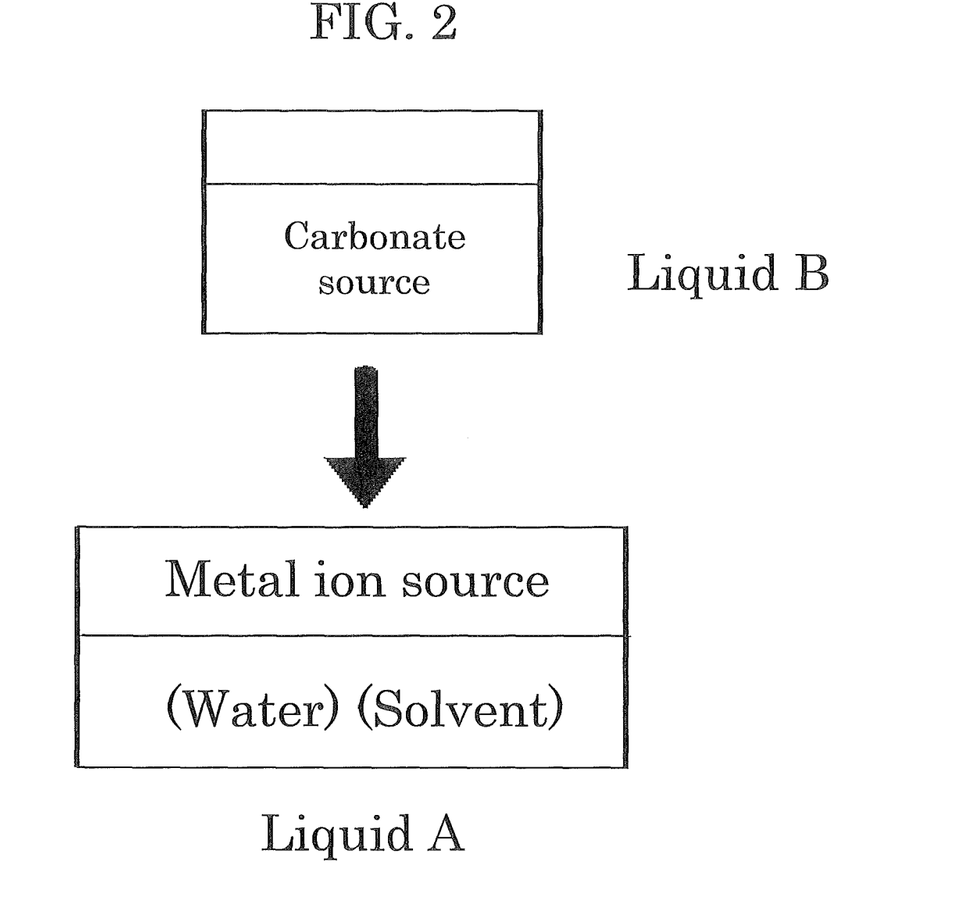
FIG. 2 is a process drawing illustrating an example of process of producing a carbonate crystal by means of a single-jet method in the method for producing an optical resin composition of the present invention.

The single-jet method can also be performed using the above-noted double-jet reactive crystallization apparatus. However, the single-jet method requires only one nozzle. For example, as shown in FIG. 2, a carbonate source (Liquid B) sprayed from a nozzle is added to a metal ion source (Liquid A) in a tank, thereby the metal ion source can be reacted with the carbonate source just as in the double-jet method.

The addition rate of the metal ion source and the carbonate source, and the stirring rate in the single-jet method are not particularly limited and may be suitably selected in accordance with the intended use, however, the addition rate and the stirring rate in the single-jet method are preferably within the same range as those in the double-jet method. In the single-jet method, when the treatment of increasing the number of the carbonate particle and the treatment of increasing the volume of the carbonate particle are separately performed, in the course of forming the final product, the addition rate and the reaction temperature used in each treatment may also be varied.

—Treatment of Increasing the Number of Carbonate Particle—

The treatment of increasing the number of the carbonate particle is not particularly limited and may be suitably selected in accordance with the intended use as long as the number of a carbonate particle can be increased after formation of carbonate. Examples thereof include a method in which any one of a metal ion source and a carbonate source is added to and mixed with a liquid of which a reaction temperature is set at a given temperature.

Examples of the methods using the single-jet method include a method in which an aqueous solution containing the carbonate source is added at a given addition rate and then mixed to either an aqueous solution containing the metal ion source or a suspension containing the metal ion source while maintaining the aqueous solution or the suspension at a given reaction temperature.

The reaction temperature is preferably −10° C. to 40° C., and more preferably 1° C. to 25° C. When the temperature used in the treatment of increasing the number of the carbonate particle is less than −10° C., a carbonate formed in a needle-like shape or a rod-shape cannot be obtained, and a spherically shaped or an ellipsoid-shaped carbonate may be yielded. When the temperature is more than 40° C., a carbonate having a shape of an aspect ratio greater than 2 within a nanometer size region may not be yielded due to oversized primary particles.

The addition rate is not particularly limited and may be suitably adjusted in accordance with the intended use. Specifically, the addition rate is preferably 0.01 mL/min to 500 mL/min, and more preferably 0.01 mL/min to 100 mL/min.

—Treatment of Increasing the Volume of Carbonate Particle—

The treatment of increasing the volume of the carbonate particle is not particularly limited and may be suitably selected in accordance with the intended use as long as the volume of the carbonate particle can be increased without increasing the number of the carbonate particles. Examples thereof include a method in which at least any one of a metal ion source and a carbonate source is added to and mixed with the other source under the condition of a reaction temperature higher than that used in the treatment of increasing the number of the carbonate particles and at an addition rate faster than that used in the treatment of increasing the number of the carbonate particles. The term "without increasing the number of the carbonate particle" in the treatment of increasing the volume of the carbonate particle means that the number of carbonate particles upon completion of the treatment of increasing the volume of the carbonate particle is increased not over 40% of the number of carbonate particles upon completion of the treatment of increasing the number of the carbonate particle. The number of carbonate particles upon completion of the treatment of increasing the volume of the carbonate particle is preferably increased not over 30%, and more preferably, not over 20% of the number of carbonate particles upon completion of the treatment of increasing the number of the carbonate particle.

Examples of the addition and mixing methods include a method in which any one of the aqueous solution containing the carbonate source or a gas containing the carbonate source is added to and mixed with the metal ion source under the conditions of a reaction temperature higher than that used in the treatment of increasing the number of the carbonate particle and an addition rate faster than that used in the treatment of increasing the number of the carbonate particle.

The reaction temperature is preferably 1° C. to 60° C., and more preferably 1° C. to 55° C. When the reaction temperature is lower than 1° C., handling of formed particles may be troublesome because a solvent to be used is subjected to restraints. When the reaction temperature is higher than 60° C., a solvent other than water may be evaporated.

The addition rate is not particularly limited and may be suitably adjusted in accordance with the intended use as long as it is faster the addition rate used in the treatment of increasing the number of the carbonate particle. For example, the addition rate is preferably 0.1 mL/min to 100 mL/min, and more preferably 0.1 mL/min to 50 mL/min. When the addition rate is slower than the addition rate in the treatment of increasing the number of the carbonate particle, the shape of the obtained aspect ratio may not be controlled.

—pH—

The pH of a liquid in which the metal ion source is reacted with the carbonate source is preferably in an alkali atmosphere in terms that a needle-like or a rod-like shaped carbonate crystal is easily obtainable. Specifically, the pH of the liquid is preferably 9 or more, and more preferably 9.5 or more. When the pH of the liquid is less than 9, the transparency of a resin to which the carbonate crystal of the present invention is added may be lowered.

When the metal ion source contains an OH group, it is preferable to keep the pH of the liquid from the start of reaction to the reaction end. When the metal ion source does not contain an OH group, it is preferred that an agent for forming an alkali atmosphere such as NaOH is added to a liquid such that the pH of the liquid is within the above-noted range, and then reaction is performed.

—Concentration of Metal Ion Source and Carbonate Source in Reaction—

The metal ion concentration in the metal ion source and the carbonic acid ion concentration in the carbonate source used in the reaction are not particularly limited and may be suitably adjusted in accordance with the intended use, however, the metal ion concentration in the metal ion source is preferably 0.05 mol/L or more, and more preferably 0.10 mol/L or more from the perspective of reactivity.

—Other Processes—

When the metal ion source is reacted with the carbonate source, it is preferable to react them in the presence of an organic solvent.

The organic solvent is not particularly limited and may be suitably selected in accordance with the intended use. Examples of the organic solvent include methanol, ethanol, 1-propanol, isopropyl alcohol, 2-aminoethanol, 2-methoxy ethanol, acetone, tetrahydrofuran, 1,4-dioxane, N,N-dimethylformamide, N,N-dimethylacetoamide, N-methylpyrrolidone, 1,3-dimethyl-2-imidazolidone, and dimethylsulfoxide. Each of these may be used alone or in combination of two or more. Of these, the alcohols are preferably used. From the perspective of reactivity and easy availability of materials, methanol, ethanol, isopropyl alcohol, and 2-aminoethanol are more preferably used.

The content of the solvent is preferably 1% by volume to 80% by volume, and more preferably 20% by volume to 80% by volume, relative to an amount of a solvent after the carbonate is produced.

—Treatment of Removing Adsorbate—

Before carbonate crystals obtained by reacting the metal ion source with the carbonate source is dried in a subsequent dry process, it is preferable to remove adsorbates from surfaces of carbonate crystal particles. In the process of producing carbonate crystals, ions derived from the starting materials used in preparing particles and reaction by-products and the like are adsorbed on surfaces of the carbonate crystal particles in liquid, and may often affect interaction between particles, such as changes in electrostatic repulsive forces, and flocculation of particles in liquid is inconveniently accelerated. Drying the carbonate crystals in such a condition only gives rise to flocculated carbonate particles. As a result, even if the flocculated particles are added to the resin, the flocculated particles cannot be dispersed, and thus the flocculated carbonate crystal particles may be sometimes contained in the resin.

The method of removing adsorbates is not particularly limited, and a method of separating and removing unnecessary components from a particle surface may be suitably selected in accordance with the intended use. Examples thereof include a method that includes the steps of adding pure water to the carbonate crystal particles, sufficiently stirring the mixture, allowing the mixture to stand, and washing the carbonate crystal particles washed at least once by decantation; and a method in which a liquid containing carbonate crystal particles is subjected to ultrafiltration at least once using a function-separated polymer membrane. It is preferable to perform at least one of these methods. The extent of removing the adsorbates can be determined by measuring the conductivity of a supernatant obtained by decantation or a filtrate obtained by ultrafiltration. The supernatant or the filtrate has a conductivity of preferably 100 μS/cm or less, and more preferably 50 μS/cm or less. When the optical resin composition is produced using carbonate particles obtained from the supernatant or the filtrate having a conductivity of greater than 100 μS/cm, foaming may be observed in kneading.

The function-separated polymer membrane is not particularly limited and may be suitably selected in accordance with the intended use. Preferred examples thereof include ion exchange resins such as strongly basic or weakly basic anionic exchange resins, strongly acidic or weakly acidic cationic exchange resins, porous ion exchange resins having a large mesh structure, and chelate resins. Preferred examples of the function-separated polymer membrane include reverse osmosis membranes (such as a cellulose acetate membrane, a cellulose triacetate membrane, a polypiperazine amide membrane, a all aromatic polyamide membranes, a polybenzimidazolone membrane, a crosslinked polyether membrane, an alkylallylpolyamide-polyurea membrane, a polyacrylonitrile membrane, and a sulfone polysulfone membrane); microfiltration membranes (such as a acetylcellulose membrane, a polypropylene membrane, a polyvinyl chloride membrane, a polyvinyl alcohol membrane, a polyester membrane, a polyamide membrane, and a polyimide membrane); ultrafiltration membranes (such as a cellulose membrane, a cellulose/reproduced cellulose membrane, a polyimide membrane, a polysulfone membrane, a polyamide membrane, a polyvinyl chloride membrane, a polypropylene membrane, and a polyvinylidene chloride; a flat membrane, a tube-like membrane, a hollow fiber membrane, a spiral membrane, and a pleated membrane may be used); dialysis membranes (a cellulose membrane, an acrylonitrile-based hollow fiber membrane, an ethylene/vinyl alcohol copolymer hollow fiber membrane, a polymethyl methacrylate membrane, a hollow fiber membrane, a polysulfone hollow fiber membrane, a polypropylene hollow fiber membrane, and a reproduced cellulose membrane); and ion exchange membranes used in electrodialysis (an inorganic ion exchange membrane, a sulfonated styrene/divinyl benzene crosslinked polymer membrane, an aminated chloromethylstyrene/divinyl benzene crosslinked polymer membrane, a N-methylated vinylpyridine/divinyl benzene crosslinked polymer membrane, a perfluorocarbon-based carboxylic acid membrane, and a styrene/butadiene membrane). Of these function-separated membranes, the ultrafiltration membranes or the dialysis membranes are more preferable. The molecular mass cut off of the ultrafiltration membrane or the dialysis membrane which is preferably used in the present invention is not particularly limited as long as the effect of the present invention can be exerted. However, the molecular mass cut off is typically about 3,000 to 50,000.

These materials are described in detain in Chapters of 16th and 17th of "Functional Polymer Materials, Products and Market Ver. 1994" (issued by Tokyo Techno Brain). These products are available from, as ion exchange resins, Rohm & Haas Japan K.K. (Amber Light, Duo Light), Dow Chemical Co. (Dow X) etc.; as ion exchange films, Asahi Kasei Corporation (Asiplex), Asahi Glass Co. (Celemion), Tokuyama Sotatsu K.K. (Neocepta), DUPONT (Nafion) etc.; as microfiltration membranes, FUJIFILM Corporation (Microfilter) etc.; as ultrafiltration membranes, Asahi Kasei Corporation (Microza UF Lab module), KURARAY Co. Ltd. (MU), DAICEL CHEMICAL INDUSTRIES, LTD. (MOLSEP) etc.; as reverse osmasis membranes, Toray Industries, Inc. (PEC-1000), DNV Japan (NTR7250), DUPONT (B9, and B10) etc.: and as dialysis membranes, Sanko Junyaku Co. (dialysis membranes, cellulose tubes, manufactured by VISKASE).

—Dry Treatment—

The carbonate crystal that has been subjected to the treatment of removing an adsorbate is preferably subjected to a dry treatment.

The method for drying the carbonate crystal is not particularly limited and may be suitably selected. Examples thereof include a filtration.

—Application—

According to the process of producing a carbonate crystal, a carbonate having a predetermined specific surface area, an orientation birefringence, and a large aspect ratio can be efficiently and simply formed without having flocculation of particles because the adsorbate on particle surfaces have been removed.

—Process of Dispersing Carbonate Crystal—

A process of dispersing a carbonate crystal includes a treatment of dispersing the carbonate crystal of the present invention in the resin and further includes other treatments suitably selected in accordance with the intended use.

A method for dispersing a carbonate crystal in the resin is not particularly limited and may be suitably selected in accordance with the intended use as long as the objects of the present invention can be achieved. For example, the carbonate crystals may be dispersed into the resin by kneading the carbonate crystals with the resin, or when the resin is subjected to a polycondensation reaction so as to synthesize the resin, the carbonate crystal may be added and dispersed into the resin before completion of the polycondensation reaction. The temperature at which the carbonate crystal particles are dispersed in the resin by kneading depends on the resin to be used. When the resin mainly contains polycarbonate, the dispersion temperature is preferably 200° C. to 290° C., and more preferably 220° C. to 280° C. When the dispersion temperature is less than 200° C., the carbonate may not be mixed with the resin. When the dispersion temperature is more than 290° C., the physical properties of the resin may be greatly changed.

A method for molding a resin composition in which carbonate crystals are dispersed is not particularly limited and may be suitably selected in accordance with the intended use. Examples thereof include an injection molding, press molding and extrusion molding. These molding methods may be used alone or in combination of two or more. The form of the obtained molded article is not particularly limited and may be suitably selected in accordance with the intended use. Examples thereof include a plane shape such as a sheet shape and film shape, an indeterminate form of solid such as a columnar shape, and a block shape.

The temperature for the injection molding depends on a resin to be used. When a resin mainly contains polycarbonate, the temperature of the injection molding is preferably 150° C. to 270° C., more preferably 150° C. to 240° C. When the temperature of the injection molding is less than 150° C., or more than 270° C., a desired molded article may not be obtained.

The temperature and pressure for the press molding are preferably 150° C. to 240° C. and 15 MPa to 45 MPa, more preferably 160° C. to 230° C. and 10 MPa to 40 MPa, respectively. When the molding temperature is less than 150° C., a desired film thickness cannot be obtained by the press molding. When the temperature is more than 240° C., a film-shaped may not be obtained. When the molding pressure is less than 10 MPa, a desired film thickness may not be obtained by the press molding. When the pressure is more than 40 Mpa, the resin composition may not be adjusted to a desired film thickness, however, it also depends on a spacer for adjusting a film thickness.

Alternatively, a sheet may be produced by means of the injection molding at low cost, in which molded bodies can be obtained continuously by injecting the resin composition without a mold. The temperature of the injection molding is preferably 220° C. to 280° C., and more preferably 230° C. to 270° C. When the temperature of the injection molding is less than 220° C., the resin may be stabilized and not be injected. When the temperature of the injection molding is more than 280° C., a film surface may not be satisfactorily obtained.

A method for aligning molecules in a molded sheet is not particularly limited and may be suitably selected in accordance with the intended use as long as the objects of the present invention can be achieved. Examples thereof include a uniaxial drawing method and biaxial drawing method. The biaxial drawing method can longitudinally and laterally draw the molded sheet in sequence or at the same time. The molded sheet may be drawn after it has been cut in a predetermined size; alternatively, the molded sheet may be molded and then sent to a drawing device for drawing.

A film of the optical resin composition can be obtained by drawing a 100 μm-thick sheet, which is drawn to 2 times the original size by the injection molding or press molding, at 165° C. and at a speed of 3 mm/min by a biaxial drawing device. Alternatively, a sheet obtained by the injection molding can be consecutively drawn to 2 times the original size at 165° C. and at a speed of 3 mm/min by a biaxial drawing device.

EXAMPLES

Hereinafter, Examples of the present invention will be explained, but the present invention is not limited thereto.

Example 1

Production of Carbonate Crystal

As shown in FIG. 2, carbonate was produced by means of the single-jet method.

—Treatment of Increasing the Number of Carbonate Particle—

375 mL (75 ml of water, 300 ml of methanol) of a 0.08 mol/L strontium hydroxide [$Sr(OH)_2$] suspension which had been prepared from strontium hydroxide octahydrate as a metallic ion source in a stainless-steel pot was taken as Liquid A. While, 500 mL of a 0.2 mol/L ammonium carbonate [$(NH_4)_2CO_3$] aqueous solution as a carbonate source was taken as Liquid B, Liquid B was then poured into two feed tanks separately, and the temperature was maintained at 10° C. While stirring Liquid A at 1,000 rpm with the temperature maintained at 10° C., 62.5 mL of Liquid B in each of the two feed tanks was respectively added to Liquid A in the stainless-steel pot at an addition rate of 0.5 mL/min and then mixed.

—Treatment of Increasing the Volume of Carbonate Particle—

Next, 250 mL of a 0.1 mol/L strontium hydroxide [$Sr(OH)_2$] suspension (Liquid A) was poured into the mixture of Liquid A and Liquid B while stirring Liquid A at 1,000 rpm with the temperature raised to 50° C., and then 250 mL of a 0.1 mol/L ammonium carbonate [$(NH_4)_2CO_3$] aqueous solution was slowly added thereto at an addition rate of 1 mL/min.

—Treatment of Removing Adsorbate—

A cycle of adding 1 liter of pure water to the mixed liquid, allowing the mixture to stand, and removing the water by decantation was repeated until the supernatant had a conductivity of 52 μS/cm.

To the liquid, PLENACT KR44, manufactured by Ajinomoto Fine-Techno Co., Ltd., was added to a concentration of 3% by mass relative to a generated sediment, and was sufficiently stirred for surface treatment.

—Drying Process—

Finally, the obtained sediment in the liquid was subjected to suction filtration using a Buchner funnel, and a cake was dried at 150° C. for 2 hours to obtain a white dry powder.

—Evaluation of Carbonate—

The dried powder was measured using an X-ray diffractometer, and the measurement result showed that the powder was comprised of strontium carbonate crystals. Further, the strontium carbonate crystals were observed using a transmission electron microscope (TEM). From a TEM picture of particles, a particle size, aspect ratio, variation coefficient obtained from Formula (1) were found. The variation coefficient was obtained by measuring each of the particles in an image file using image analysis type of particle distribution measuring software "Mac-View" Ver. 3 (manufactured by MOUNTECH Co., Ltd.) and counting the measured values. The specific surface area was measured using an automatic specific surface area/micropore distribution analyzer (BEL-SORP-mini, manufactured by BEL JAPAN Inc.). The strontium carbonate crystals were heated at 200° C. for pretreatment. The results are shown in Table 3.

—Process of Dispersing Carbonate Crystal and Evaluation of Optical Resin Composition—

The obtained carbonate particles and polycarbonate resins were kneaded at 220° C. by a small kneader, so that the content of the carbonate particles was 1% by mass relative to the resin, thereby obtained a composite resin in a form of a pellet. The resin was injection molded at 220° C., and a sheet having a thickness of 100 μm was produced by press molding at 220° C./30 MPa as an optical resin composition. At this step, the light transmittance of the composition was measured and its dispersibility was evaluated by SEM. Moreover, the 100 μm-thick sheet was cut out in a size of 55 mm×30 mm, and was uniaxially drawn to 1.5 times the original size at 165° C. and at a speed of 3 mm/rain by a biaxial drawing device by Imoto seisakusho to obtain an optical resin composition having a thickness of 68 μm. The results are shown in Table 3.

Example 2

A treatment of increasing the number of carbonate particles was conducted as in Example 1 except that 375 mL of the suspension of Liquid A (50 ml of water, 325 ml of methanol) was maintained at 5° C., and Liquid B was added at an addition rate of 0.3 mL/min.

A treatment of increasing the volume of carbonate particles was conducted as in Example 1 except that 250 mL of an ammonium carbonate $[(NH_4)_2CO_3]$ aqueous solution was added at an addition rate of 0.5 mL/min.

A treatment of removing adsorbates from particle surfaces was conducted by subjecting the mixed liquid to ultrafiltration by means of Microza UF Lab module (by Asahi Kasei Chemicals) made of polysulfone and having a molecular mass cut off of 6,000 until a filtrate had a conductivity of 28.6 μS/cm.

Finally, a cake was dried at 150° C. for 2 hours to obtain a white dry powder. The obtained carbonate crystal and optical resin composition were evaluated in the same manner as in Example 1. The results are shown in Table 3.

Example 3

A treatment of increasing the number of carbonate particles was conducted as in Example 2 except that Liquid B was added at an addition rate of 0.4 mL/min.

A treatment of increasing the volume of carbonate particles was conducted as in Example 2 except that 250 mL of an ammonium carbonate $[(NH_4)_2CO_3]$ aqueous solution was added at an addition rate of 0.7 mL/min.

The adsorbates on particle surfaces were removed by subjecting the mixed liquid to ultrafiltration until a filtrate had a conductivity of 27.2 μS/cm.

Finally, a cake was dried at 150° C. for 2 hours to obtain a white dry powder. The obtained carbonate crystal and optical resin composition were evaluated in the same manner as in Example 1. The results are shown in Table 3.

Example 4

The carbonate crystal and optical resin composition were evaluated in the same manner as in Example 3 except that a calcium hydroxide suspension was used instead of the strontium hydroxide suspension of Liquid A in Example 3. The results are shown in Table 3.

Example 5

The carbonate crystal and optical resin composition were evaluated in the same manner as in Example 3 except that a barium hydroxide suspension was used instead of the strontium hydroxide suspension of Liquid A in Example 3. The results are shown in Table 3.

Example 6

The carbonate crystal and optical resin composition were evaluated in the same manner as in Example 3 except that a zinc hydroxide suspension was used instead of the strontium hydroxide suspension of Liquid A in Example 3. The results are shown in Table 3.

Example 7

The carbonate crystal and optical resin composition were evaluated in the same manner as in Example 3, except that a lead hydroxide suspension was used instead of the strontium hydroxide suspension of Liquid A in Example 3. The results are shown in Table 3.

Example 8

A treatment of increasing the number of carbonate particles was conducted as in Example 1 except that 375 mL of the suspension of Liquid A (50 ml of water, 325 ml of methanol) was maintained at 3° C. and that Liquid B was added at an addition rate of 0.1 mL/min.

A treatment of increasing the volume of carbonate particles was conducted as in Example 1 except that the temperature was raised to 45° C. and that 250 mL of an ammonium carbonate $[(NH_4)_2CO_3]$ aqueous solution was added at an addition rate of 0.4 mL/min.

The adsorbates on particle surfaces were removed by subjecting the mixed liquid to decantation continuously until a filtrate had a conductivity of 28.6 μS/cm.

Finally, a cake was dried at 150° C. for 2 hours to obtain a white dry powder. The obtained carbonate crystal and optical resin composition were evaluated in the same manner as in Example 1. The results are shown in Table 3.

Example 9

The carbonate crystal and optical resin composition were evaluated in the same manner as in Example 8 except that the temperature of the treatment of increasing the number of the carbonate particle was changed to 5° C. The results are shown in Table 3.

Example 10

The carbonate crystal and optical resin composition were evaluated in the same manner as in Example 9 except that the temperature of increasing the volume of the carbonate particle was changed to 47° C. The results are shown in Table 3.

Comparative Example 1

The carbonate crystal and optical resin composition were evaluated in the same manner as in Example 1 except that the content of the obtained carbonate particles was changed to 17% by mass relative to resin in Example 1.

Comparative Example 2

The carbonate crystal and optical resin composition were evaluated in the same manner as in Example 1 except that decantation was not performed and the obtained sediment in the liquid was subjected to suction filtration using a Buchner funnel in Example 1. A filtrate had a conductivity of 9,735 μS/cm. The results are shown in Table 3.

Comparative Example 3

250 mL (250 ml of water) of a 0.05 mol/L strontium hydroxide $[Sr(OH)_2]$ suspension which had been prepared from strontium hydroxide octahydrate as a metallic ion source in a stainless-steel pot was taken as Liquid A, and a 4.00 g of sodium hydroxide granulated powder was dissolved in Liquid A. While 500 mL of a 4 mol/L urea $[(NH_2)_2CO]$ aqueous solution was taken as Liquid B. While stirring Liquid A at 1,000 rpm with a temperature raised and maintained at 90° C., 500 mL of Liquid B was poured into one feed tank and added to Liquid A in the stainless-steel pot at an addition rate of 250 mL/min and then mixed. A cycle of adding 1 liter of pure water to the mixed liquid, allowing the mixture to stand, and removing the water by decantation was repeated until a supernatant having a conductivity of 84 µS/cm was obtained. Finally, a cake was dried at 150° C. for 2 hours to obtain a white dry powder.

The obtained carbonate crystal and optical resin composition were evaluated in the same manner as in Example 1. The results are shown in Table 3.

Comparative Example 4

Only a polycarbonate resin was kneaded at 220° C. by a small kneader to obtain a resin in a form of pellet. The resin was injection molded at 220° C., and a sheet having a thickness of 100 µm was prepared by press molding at 220° C./30 MPa as an optical resin composition. At this step, the light transmittance of the composition was measured. A 100 µm-thick sheet was cut out in a size of 55 mm×30 mm, and was uniaxially drawn to 1.5 times the original size at 165° C. and at a speed of 3 mm/min by a biaxial drawing device by Imoto seisakusho to obtain an optical resin composition having a thickness of 68 µm. The results are shown in Table 3.

as in Example 1, and it was confirmed that those are comparable with those measured in Example 1.

It was also confirmed that similar effects were obtained with polyethylene naphthalate resin compositions and triacetylcellulose resin compositions.

An optical resin composition containing the carbonate crystal of the present invention is able to negate the birefringence without sacrificing light transmittance; therefore, it may be preferably used as a resin material that constitutes an optical component, particularly optical elements with which birefringent properties is important and high precision is required.

A method for producing an optical resin composition according to the present invention may easily and efficiently produce a carbonate crystal having a predetermined specific surface area, an oriented birefringence and high aspect ratio without having flocculation of particles because adsorbates on particle surfaces have been removed, and may be suitably used to produce an optical resin composition of the present invention.

TABLE 3

| | specific surface area *1) [m²/g] | Aspect ratio [—] | Average of maximum major axis lengths [nm] | Variation coefficient represented by Formula (1) [%] | Composition of particles | Added amount [%] | Form | Light transmittance *2) [%] | Average dispersion diameter [nm] | Dispersion Condition *3) | Conductivity [µS/cm] | Birefringence index *4) [—] |
|---|---|---|---|---|---|---|---|---|---|---|---|---|
| Ex. 1 | 11 | 4.2 | 395 | 31 | $SrCO_3$ | 1 | film | 88.2 | 450 | A | 52 | $1 \times 10^{-4}$ |
| Ex. 2 | 15 | 4 | 267 | 38 | $SrCO_3$ | 1 | film | 89.4 | 387 | A | 28.6 | $1 \times 10^{-4}$ |
| Ex. 3 | 4 | 3.8 | 315 | 35 | $SrCO_3$ | 1 | film | 86.5 | 410 | A | 27.2 | $3 \times 10^{-4}$ |
| Ex. 4 | 4 | 3.4 | 363 | 40 | $CaCO_3$ | 1 | film | 86.9 | 436 | A | 43 | $6 \times 10^{-4}$ |
| Ex. 5 | 6 | 4.8 | 343 | 32 | $BaCO_3$ | 1 | film | 88 | 420 | A | 56 | $5 \times 10^{-4}$ |
| Ex. 6 | 8 | 4.4 | 345 | 28 | $ZnCO_3$ | 1 | film | 87.8 | 487 | A | 42 | $2 \times 10^{-4}$ |
| Ex. 7 | 10 | 3.9 | 334 | 33 | $PbCO_3$ | 1 | film | 88.1 | 431 | A | 50 | $4 \times 10^{-4}$ |
| Ex. 8 | 4 | 4 | 150 | 30 | $SrCO_3$ | 1 | film | 89 | 290 | A | 26.7 | $4 \times 10^{-5}$ |
| Ex. 9 | 4 | 4.4 | 300 | 25 | $SrCO_3$ | 1 | film | 88 | 438 | A | 45 | $8 \times 10^{-5}$ |
| Ex. 10 | 4 | 4.1 | 350 | 15 | $SrCO_3$ | 1 | film | 88.2 | 473 | A | 50 | $1 \times 10^{-4}$ |
| Comp. Ex. 1 | 11 | 4.2 | 395 | 31 | $SrCO_3$ | 17 | film | 43.8 | 1248 | C | 52 | Not measured |
| Comp. Ex. 2 | 11 | 3.7 | 415 | 45 | $SrCO_3$ | 1 | film | 72.1 | 1912 | C | 9,735 | Not measured |
| Comp. Ex. 3 | 3.5 | 23.5 | 27000 | 23 | $SrCO_3$ | 1 | film | 35.4 | 34.1 | A | 84 | $4 \times 10^{-4}$ |
| Comp. Ex. 4 | — | — | — | — | — | 0 | film | 91.3 | — | — | — | $1 \times 10^{-3}$ |

*1) Values for dry power before mixed with resin.
*2) Values for light transmittance at a wavelength of 450 nm in a sheet standardized to 100 µm-thick.
*3) The dispersion condition was evaluated by SEM observation. A: Excellent dispersion, B: Some amount of flocculation existed, C: Severe flocculation
*4) Values of birefringence obtained by measuring a retardation at a wavelength 550 ± 5 nm by Automatic Birefringence Analyzer (KOBRA-21ADH, manufactured by Oji Scientific Instruments Co., Ltd.), and then dividing with a film thickness.

From the results of Table 3, it is understood that the optical resin compositions of Examples 1 and 2 in which dispersed carbonate crystals are contained have high light transmittance at a wavelength of 450 nm compared to Comparative Examples 1 to 3, and that birefringence index can be changed in contrast to Comparative Examples 1 to 3.

Example 11

A polyethylene terephthalate resin composition containing a strontium carbonate crystal was obtained by adding 1% by mass of the strontium carbonate crystal prepared in Example 1 in a polycondensation reaction of terephthalic acid and ethylene glycol. The transmittance and birefringence after the drawing process for each of the obtained polyethylene terephthalate resin compositions were measured in the same manner

What is claimed is:

1. A method for producing an optical resin composition comprising:
   producing carbonate crystals, and
   dispersing the produced carbonate crystals into a resin,
   wherein the step of producing carbonate crystals comprises reacting a metal ion source that contains at least one metal ion selected from the group consisting of $Sr^{2+}$, $Ca^{2+}$, $Ba^{2+}$, $Zn^{2+}$ and $Pb^{2+}$ with a carbonate source in liquid,
   wherein the step of producing carbonate crystals comprises removing an adsorbate from surfaces of the carbonate crystals.

2. The method for producing an optical resin composition according to claim 1, wherein the carbonate crystals have a specific surface area of 4 m²/g or more, and the carbonate crystals dispersed into the resin have an average dispersion diameter of 500 nm at a maximum.

3. The method for producing an optical resin composition according to claim 1 wherein the step of removing an adsorbate comprises any one of a method for washing the carbonate crystal at least once by decantation and a method for subjecting the carbonate crystal to ultrafiltration at least once.

4. The method for producing an optical resin composition according to claim 3, wherein a supernatant obtained by the decantation or a filtrate obtained by the ultrafiltration has a conductivity of 100 µS/cm or less.

5. The method for producing an optical resin composition according to claim 1, wherein the step of producing carbonate crystals comprises increasing, at least once, the number of the carbonate crystal in liquid, and increasing, at least once, only the volume of the carbonate crystals in liquid.

6. The method for producing an optical resin composition according to claim 5, wherein the temperature of the step of increasing the number of the carbonate crystals is −10° C. to 40° C., and a temperature of the step of increasing the volume of the carbonate crystal is 1° C. to 60° C. and not less than the temperature of the step of increasing the number of the carbonate particles.

7. The method for producing an optical resin composition according to claim 1, wherein the step of dispersing the carbonate crystals into the resin comprises dispersing the carbonate crystal into the resin by kneading.

8. The method for producing an optical resin composition according to claim 7, wherein a method for molding the optical resin composition in which the carbonate crystal is dispersed is any one of an injection molding, press molding and extrusion molding.

\* \* \* \* \*